United States Patent
Kubo et al.

(10) Patent No.: US 7,093,940 B2
(45) Date of Patent: Aug. 22, 2006

(54) ADJUSTMENT IN THE AMOUNT OF PROJECTED IMAGE DISTORTION CORRECTION

(75) Inventors: Takehiro Kubo, Matsumoto (JP); Tetsuro Tokuyama, Beppu (JP)

(73) Assignee: Seiko Epson Corporation, Tokyo (JP)

( * ) Notice: Subject to any disclaimer, the term of this patent is extended or adjusted under 35 U.S.C. 154(b) by 218 days.

(21) Appl. No.: 10/867,684

(22) Filed: Jun. 16, 2004

(65) Prior Publication Data

US 2005/0024597 A1 Feb. 3, 2005

(30) Foreign Application Priority Data

Jun. 26, 2003 (JP) ............................. 2003/182140
May 11, 2004 (JP) ............................. 2004/140890

(51) Int. Cl.
G03B 21/00 (2006.01)
G03B 21/14 (2006.01)
H04N 3/23 (2006.01)
H04N 9/74 (2006.01)
G09G 5/00 (2006.01)

(52) U.S. Cl. ......................... 353/69; 353/70; 348/580; 348/746; 348/806; 345/647

(58) Field of Classification Search .................. 353/69, 353/70; 348/745, 746, 806, 189, 580; 345/647, 345/660, 661, 662, 663, 665
See application file for complete search history.

(56) References Cited

U.S. PATENT DOCUMENTS

| 6,361,171 | B1 | 3/2002 | Ejiri et al. ................... 353/69 |
| 6,450,647 | B1 * | 9/2002 | Takeuchi ..................... 353/69 |
| 2002/0060754 | A1 * | 5/2002 | Takeuchi ..................... 348/745 |
| 2002/0122161 | A1 * | 9/2002 | Nishida et al. .............. 353/70 |

FOREIGN PATENT DOCUMENTS

| EP | 1 058 452 A1 | 12/2000 |
| EP | 1 207 691 A2 | 5/2002 |
| JP | A 2000-284363 | 10/2000 |
| JP | A 2002-6391 | 1/2002 |
| JP | A 2002-062842 | 2/2002 |
| JP | A 2003-46907 | 2/2003 |
| JP | A 2003-289485 | 10/2003 |

* cited by examiner

*Primary Examiner*—W. B. Perkey
*Assistant Examiner*—Rochelle Blackman
(74) *Attorney, Agent, or Firm*—Oliff & Berridge, PLC

(57) ABSTRACT

An exemplary aspect of the invention can provide a method for easily adjusting the distortion of a projected image. In adjusting the amount of distortion correction, values of the amount of distortion correction for a desired outline form to be formed based on desired positions are calculated after the desired positions can be specified. Then whether all the calculated values of the amount of distortion correction are within a predetermined range where an original image is transformable into a distortion correction image can be judged. If all the calculated values of the amount of distortion correction are within the predetermined range, the calculated values of the amount of distortion correction can be set in an image distortion correction part. If a value out of the calculated values of the amount of distortion correction is beyond the predetermined range, outlines corresponding to at least part of the outline form of the projected image are produced, instead of setting the calculated values of the amount of distortion correction in the image distortion correction part. An outline corresponding to the amount of distortion correction beyond the predetermined range can be made differently from an outline corresponding to the amount of distortion correction within the predetermined range, so that each is identified.

8 Claims, 13 Drawing Sheets

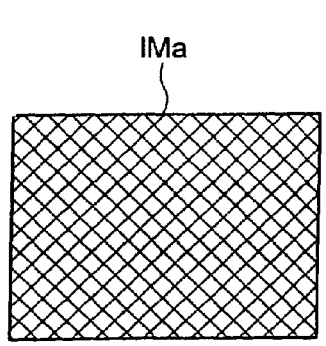
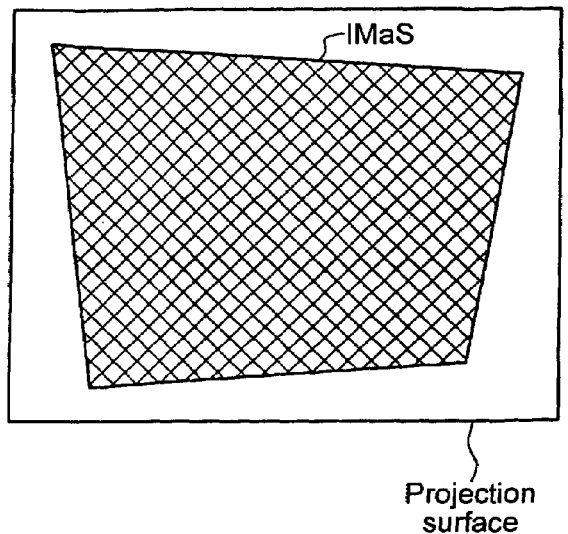
FIG. 11A-1
RELATED ART
FIG. 11A-2
RELATED ART
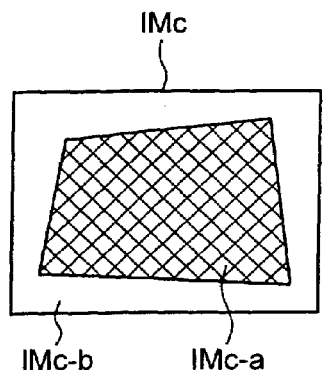
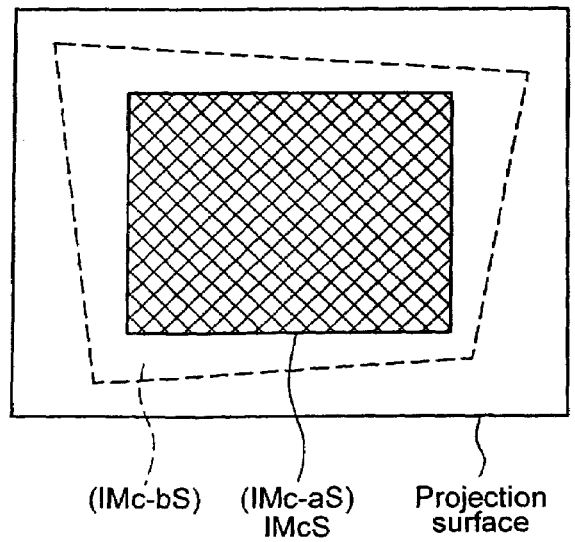
FIG. 11B-1
RELATED ART
FIG. 11B-2
RELATED ART

ADJUSTMENT IN THE AMOUNT OF PROJECTED IMAGE DISTORTION CORRECTION

BACKGROUND OF THE INVENTION

1. Field of Invention

The present invention relates to a method for correcting projected image distortion that occurs when an image is projected by a projector obliquely on a projection surface.

2. Description of Related Art

In a projector, light emitted from an illumination optical system is modulated by a spatial light modulator, such as a liquid crystal light valve (liquid crystal panel) according to an image signal. The modulated light is projected on a projection surface, and thus an image is displayed. Examples of spatial light modulators may include, but not be limited to the crystal light valve. For example, a projector may employ Digital Micromirror Device™ (a trademark of Texas Instruments Incorporated) or devices using other technologies.

When an image is projected on a projection surface with the central axis of light for forming an image (image light) emitted from a projector not corresponding to the normal of the projection surface, the image displayed on the projection surface will be distorted. Even if the projector is to project a rectangular image on the projection surface, the image displayed on the projection surface may be distorted into a shape not rectangular but rather quadrangular. The distortion of the projected image can be corrected by adjusting the shape of an image formed by image light emitted from a liquid crystal light valve, in other words, by adjusting the shape of the image formed in the area of optical modulation (imaging area) of the liquid crystal light valve.

FIG. 11 shows an exemplary method for correcting the distortion of the projected image. FIG. 11A-1 shows a rectangular image IMa "original image IMa") that is formed in a rectangular imaging area of the liquid crystal light valve in the case where no distortion correction is applied. In this case, a quadrangular image IMaS that has been distorted into a shape not rectangular is displayed on the projection surface as shown in FIG. 11A-2. Here, the image shown in FIG. 11A-2 is projected obliquely on the projection surface from the lower right to the normal of the projection surface.

FIG. 11B-1 shows a corrected image IMc that is formed in the imaging area of the liquid crystal light valve in the case where the distortion of the projected image shown in FIG. 11A-2 is corrected. The corrected image IMc consists of a distortion correction image IMc-a and a background image IMc-b. The distortion correction image IMc-a is an inverted image of the image shown in FIG. 11A-2, and is formed by transforming the original image IMa. The background image IMc-b is composed of black pixels. As the corrected image IMc is formed in the imaging area of the liquid crystal light valve, only the distortion correction image IMc-a in the corrected image IMc is projected. Consequently, a rectangular image IMcS (IMc-aS) shown in FIG. 11B-2 is displayed on the projection surface.

An exemplary method for transforming the original image IMa so as to form the distortion correction image IMc-a is disclosed in, for example, Japanese Unexamined Patent Application Publication No. 2002-6391 and Japanese Unexamined Patent Application Publication No. 2003-46907.

SUMMARY OF THE INVENTION

The shape of the distortion correction image IMc-a can be adjusted by specifying positions (coordinates) of four vertexes of the original image IMa in the imaging area of the liquid crystal light valve, for example. FIG. 12 shows an example of the process of adjusting the shape of the distortion correction image IMc-a. Here, the shape of the distortion correction image IMc-a can be set to be the same as the original image IMa, which is rectangular, in an initial condition where no distortion correction is applied. Here, it is understood that the four vertexes of the original image IMa are set at four corner positions A0, B0, C0, and D0 of the imaging area of the liquid crystal light valve under the initial condition with no distortion correction.

First, the upper left vertex located in the position A0 is selected and moved horizontally and vertically as shown in FIG. 12A. The original image IMa is transformed into the shape of the distortion correction image IMc-a, which is determined according to the position to which the selected upper left vertex is moved, and formed in a corresponding position on the liquid crystal light valve. Then the distortion correction image IMc-a, which has been formed, is projected. Here, it is possible to set the selected upper left vertex to be at a desired position A1 by appropriately moving the position of the selected upper left vertex while checking the shape of the projected image. In the same manner, the upper right vertex located in the position B0 is set to be at a desired position B1 as shown in FIG. 12B, the lower right vertex located in the position C0 is set to be at a desired position C1 as shown in FIG. 12C, and the lower left vertex located in the position D0 is set to be at a desired position D1 as shown in FIG. 12D.

In the process of adjusting the shape of the distortion correction image IMc-a, it should be noted that the shape of the distortion correction image IMc-a is not freely definable. This means that there are limitations to the slope of four sides joining the four vertexes A1, B1, C1, and D1 of the distortion correction image IMc-a that is definable, the horizontal and vertical compression rate of the distortion correction image IMc-a to the original image IMa, and so on, depending on the performance of transforming the original image IMa into a shape like the distortion correction image IMc-a. As a result, the following problem can arise.

FIG. 13 illustrates a problem caused by conventional methods. Here, a case where the upper left vertex located in the position A0 is moved to the position A1 as shown in FIG. 12A is given as an example. In this case as shown in FIG. 13, the horizontal slope of a side L1 joining the positions Ap and B0 reaches a limit of variation at an intermediate position Ap. Since it becomes impossible to correctly transform an image beyond this limit of the slope, distortion correction may not be accurately provided any further. The vertical slope of a side L4 joining the positions Ap and D0 may also reach a limit of variation likewise, which may prevent distortion correction from being accurately provided beyond this limit of the slope.

Therefore, when the slope of the side L1 or L4 reaches a limit at the position Ap while forming the distortion correction image IMc-a by moving the upper left vertex located in the position A0 to the position A1, it is common that any movement of the vertex in a way that the slope of the side L1 or L4 increases is prohibited, and thereby any further adjustment is not allowed. This also applies to the other vertexes.

If a further adjustment is prohibited like the above mentioned while moving a selected vertex, a user sees from the projected image that any further adjustment is not allowed. It is, however, not clear that any further adjustment is not allowed because whether a malfunction occurs in adjusting distortion correction or the movement of the vertex is prohibited as mentioned above. The user thus does not know exactly how to cope when a further adjustment in distortion correction is not allowed. In other words, conventional methods for adjusting distortion correction of projected images have yet to provide a full solution in terms of operational performance.

The invention aims to provide a method for easily correcting the distortion of a projected image. A projector for projecting an image on a projection surface according to a first aspect of the invention can include an image distortion correction part, a desired position specification part, a distortion correction amount adjuster, and an outline production part. The image distortion correction part produces a distortion correction image by transforming an original image based on a set amount of distortion correction so as to correct distortion of the projected image that occurs if the image is projected obliquely on the projection surface. The desired position specification part specifies desired positions at which four vertexes forming an outline form of the projected image are to be located, so as to adjust the outline form of the projected image to a desired outline form. The distortion correction amount adjuster adjusts the amount of distortion correction, which is set in the image distortion correction part, based on the desired positions specified by the desired position specification part. The outline production part produces an outline corresponding to the outline form of the projected image.

In adjusting the amount of distortion correction set in the image distortion correction part, the distortion correction amount adjuster calculates values of the amount of distortion correction for the desired outline form to be formed based on the desired positions after the desired position specification part specifies the desired positions. Then the distortion correction amount adjuster judges whether all the calculated values of the amount of distortion correction are within a predetermined range where the original image is transformable into the distortion correction image. If all the calculated values of the amount of distortion correction are within the predetermined range, the distortion correction amount adjuster sets the calculated values of the amount of distortion correction in the image distortion correction part. If a value out of the calculated values of the amount of distortion correction is beyond the predetermined range, the distortion correction amount adjuster makes the outline production part produce outlines corresponding to at least part of the outline form of the projected image and makes an outline form corresponding to the amount of distortion correction beyond the predetermined range different from an outline form corresponding to the amount of distortion correction within the predetermined range so that each is identified, instead of setting the calculated values of the amount of distortion correction in the image distortion correction part.

In order to correct distortion of the projected image that occurs if the image is projected obliquely on the projection surface, the projector of the first aspect of the invention can make it possible to display an outline showing the outline form of the projected image under the condition where the outline form of the projected image cannot be transformed into the desired outline form to be formed based on the specified desired positions in adjusting the amount of distortion correction set in the image distortion correction part. This enables a user of the projector to easily see that the outline form of the projected image cannot be transformed into the desired outline form to be formed based on the specified desired positions. The projector can also make it possible to produce the outline so as to the outline form corresponding to the amount of distortion correction within a predetermined range where the original image can be transformed into the distortion correction image that is different from the outline form corresponding to the amount of distortion correction beyond the predetermined range, so that each outline form is identified. This enables the user to easily see the direction to which the outline form of the projected image cannot be changed. This makes it possible to provide better operational performance in adjusting the amount of distortion correction than conventional methods, and to easily correct the distortion of the projected image.

Each of the outline form corresponding to the amount of distortion correction that cannot be applied and the outline form corresponding to the amount of distortion correction that can be applied may be identified by using presence or absence of line, different line colors, different line widths, or different line types. Using different line colors, different line widths, or different line types makes it possible to easily identify differences in lines.

The distortion correction amount adjuster may judges whether all the calculated values of the amount of distortion correction are within a predetermined range based on the amount of a horizontal or vertical slope of each of the four sides forming the desired outline form. In the projector of the first aspect, the distortion correction amount adjuster may make the outline production part produce the outlines corresponding to the outline form of the projected image, even if all the calculated values of the amount of distortion correction are within the predetermined range. This makes it possible to display the outlines corresponding to the outline form of the projected image in adjusting the amount of distortion correction set in the image distortion correction part, and thereby making the outline form of the projected image clear.

A projector for projecting an image on a projection surface according to a second aspect of the invention can include an image distortion correction part, a desired position specification part, a distortion correction amount adjuster, and an outline production part. The image distortion correction part produces a distortion correction image by transforming an original image based on a set amount of distortion correction so as to correct distortion of the projected image that occurs if the image is projected obliquely on the projection surface. The desired position specification part specifies desired positions at which four vertexes forming an outline form of the projected image are to be located, so as to adjust the outline form of the projected image to a desired outline form. The distortion correction amount adjuster adjusts the amount of distortion correction, which is set in the image distortion correction part, based on the desired positions specified by the desired position specification part. The outline production part produces an outline corresponding to the desired outline form of the projected image to be formed by specifying the desired positions.

In adjusting the amount of distortion correction set in the image distortion correction part, the distortion correction amount adjuster calculates values of the amount of distortion correction for the desired outline form to be formed based on the desired positions after the desired position specification part specifies the desired positions. Then the distortion correction amount adjuster judges whether all the calculated values of the amount of distortion correction are within a predetermined range where the original image is transformable into the distortion correction image. If all the calculated values of the amount of distortion correction are within the predetermined range, the distortion correction amount adjuster sets the calculated values of the amount of distortion correction in the image distortion correction part. If a value out of the calculated values of the amount of distortion correction is beyond the predetermined range, the distortion correction amount adjuster makes the outline production part produce outlines corresponding to at least part of the desired outline form and makes an outline form corresponding to the amount of distortion correction beyond the predetermined range different from an outline form corresponding to the amount of distortion correction within the predetermined range so that each is identified, instead of setting the calculated values of the amount of distortion correction in the image distortion correction part.

In order to correct distortion of the projected image that occurs if the image is projected obliquely on the projection surface, the projector of the second aspect of the invention makes it possible to display an outline showing the desired outline form to be formed based on the specified desired positions under the condition where the outline form of the projected image cannot be transformed into the desired outline form to be formed based on the specified desired positions in adjusting the amount of distortion correction set in the image distortion correction part. This enables a user of the projector to easily see that the outline form of the projected image cannot be transformed into the desired outline form to be formed based on the specified desired positions. The projector also makes it possible to produce the outline so as to the outline form corresponding to the amount of distortion correction within a predetermined range where the original image can be transformed into the distortion correction image that is different from the outline form corresponding to the amount of distortion correction beyond the predetermined range, so that each outline form is identified. This enables the user to easily see the direction to which the outline form of the projected image cannot be changed. This makes it possible to provide better operational performance in adjusting the amount of distortion correction than conventional methods, and to easily correct the distortion of the projected image.

Furthermore, it is possible to display an outline corresponding to the desired outline form to be formed based on the specified desired positions. Therefore, in the case where the distortion correction image cannot be produced by only specifying a desired position for a vertex but can be produced by specifying desired positions for the other vertexes for example, the outline form of the projected image can be transformed into the desired outline form at the point where it becomes possible to produce the distortion correction image by specifying the desired positions for the other vertexes. This further improves operational performance in adjusting the amount of distortion correction compared to the projector of the first aspect.

It should be understood that the invention can be applied not only to the above-mentioned first and second aspects, but also to various aspects including an image distortion adjustment device and method.

BRIEF DESCRIPTION OF THE DRAWINGS

The invention will be described with reference to the accompanying drawings, wherein like numerals reference like elements, and wherein:

FIG. 11 shows a method for correcting the distortion of a projected image;

DETAILED DESCRIPTION OF PREFERRED EMBODIMENTS

Figure 1:
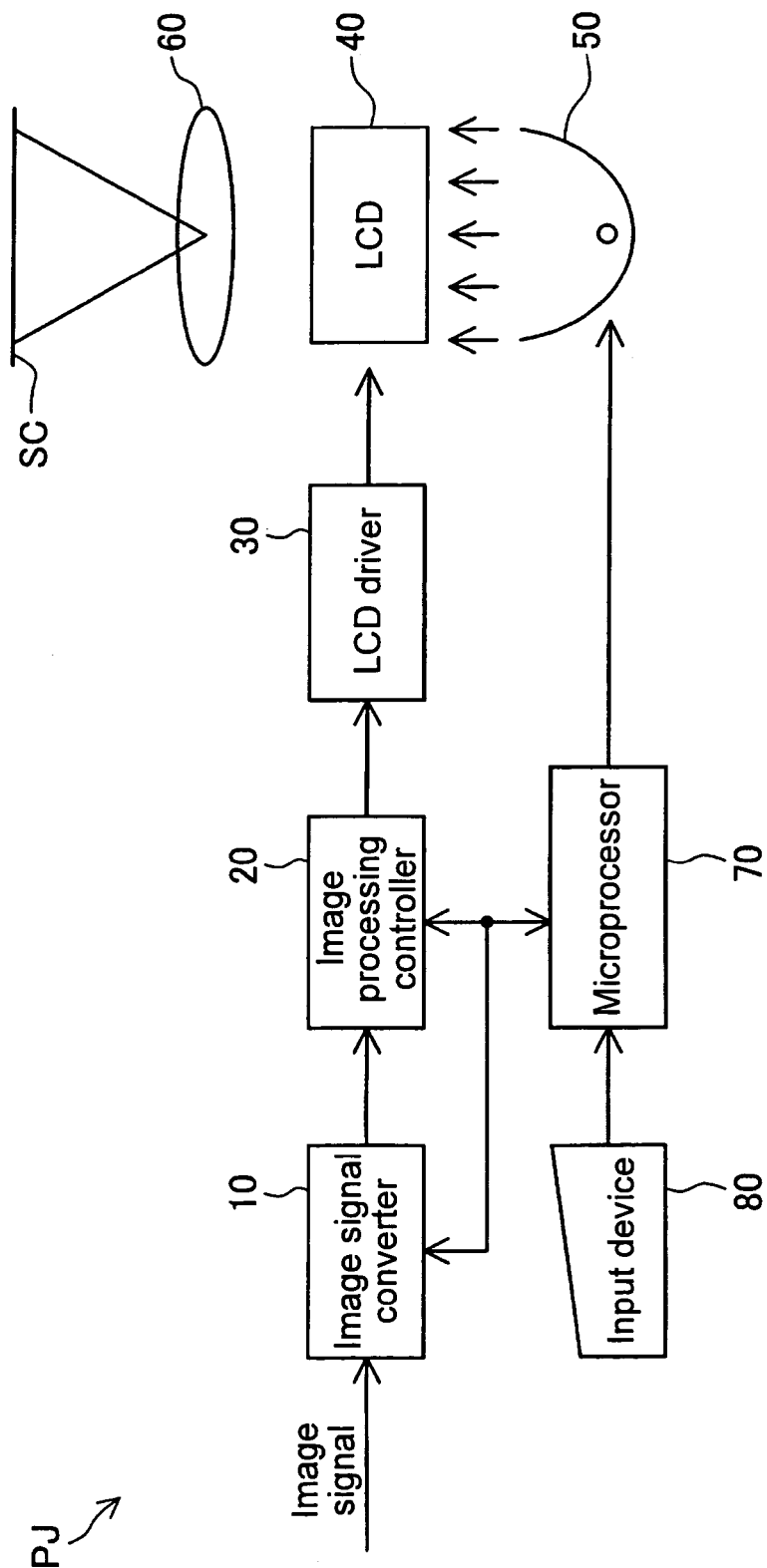
FIG. 1 is an exemplary block diagram showing the whole configuration of a projector according to the invention.

FIG. 1 is an exemplary block diagram showing the whole configuration of a projector according to the invention. As shown in FIG. 1, a projector PJ can include an image signal converter 10, an image processing controller 20, a liquid crystal display panel (LCD) driver 30, a liquid crystal display panel (LCD) 40, an illuminating optical system 50, a projection optical system 60, a microprocessor 70, and an input device 80.

Figure 2:
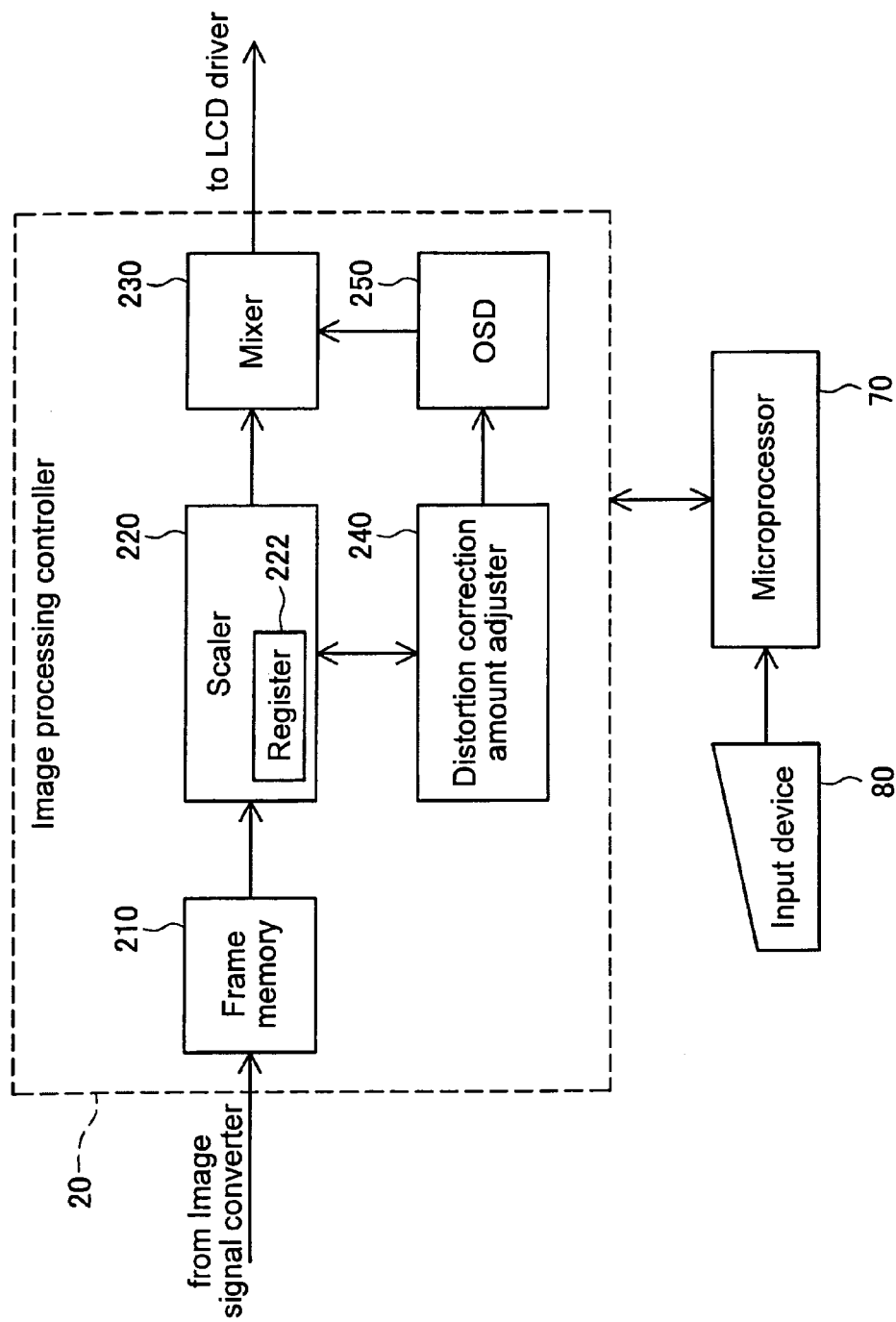
FIG. 2 is an exemplary block diagram showing the configuration of the image processing controller 20 shown in FIG. 1.

FIG. 2 is an exemplary block diagram showing the configuration of the image processing controller 20 shown in FIG. 1. The image processing controller 20 includes a frame memory 210, a scaler 220, an onscreen display part (OSD) 250, a mixer 230, and a distortion correction amount adjuster 240 as shown in FIG. 2.

The operation of image projection, which is a normal operation of the projector PJ, will now be described. Referring to FIG. 1, when a user sends a command to start image projection using the input device 80, the command is sent to the microprocessor 70. The microprocessor 70 controls each component including the image signal converter 10, the image processing controller 20, and the illuminating optical system 50 based on the command so as to project images. The image signal converter 10 receives image signals from a video player, television, DVD player, etc. or image signals from a computer and so on, and converts such image signals into digital image signals, so that they can be input to the image processing controller 20.

The image processing controller 20 performs various functions including writing and reading out of image data to and from the frame memory 210, scaling of images, and correcting the distortion of projected images. As shown in FIG. 2, the frame memory 210 stores image data included in image signals input from the image signal converter 10.

The frame memory 210 thus reads out the image data and then outputs the data to the scaler 220. The scaler 220 increases and decreases the size of images of the image data read out by the frame memory 210 according to a scaling parameter set in a register 222. The scaler 220 also transforms the image (original image) of the image data read out by the frame memory 210 to a distortion correction image according to the scaling parameter set in the register 222 in order to correct the distortion of a projected image that occurs when the image is projected obliquely on a projection surface SC. In this way corrected image data are produced based on distortion correction image data of the distortion correction image, which has been transformed.

The OSD 250 produces OSD image data, such as menu image data, and outline data to be displayed in the process of adjusting the amount of distortion correction, which will be described later, and outputs the OSD image data to the mixer 230.

The mixer 230 produces projection image data by combining the OSD image data with the corrected image data output from the scaler 220, and outputs the projection image data to the LCD driver 30. When the OSD 250 produces no OSD image data, the mixer 230 outputs the corrected image data as the projection image data.

The image processing controller 20 also provides other various functions for adjusting image data to have desired image display conditions, such as illuminance, contrast, synchronization, tracking, color thickness and shading, but their description is not particularly necessary for describing the invention so will be omitted here.

Referring to FIG. 1, the LCD driver 30 drives the LCD 40 according to the projection image data input from the image processing controller 20. Thus, the LCD 40 modulates illumination light emitted by the illuminating optical system 50 according to the projection image data. The projection optical system 60 projects light for forming an image (image light) modulated by the LCD 40 on the projection surface SC. Since the image light emitted by the LCD 40 forms an image, the area of optical modulation in the LCD can be referred to as an imaging area forming an image of the projection image data. Accordingly, it can be said that an image formed in the imaging area is projected on the projection surface SC by the projection optical system 60.

When the projector PJ projects an image obliquely to the normal of the projection surface SC, the following adjustment in the amount of distortion correction of the projected image makes it possible to adjust the amount of distortion correction of the projected image. According to the following description, the projector PJ is located in a position where it projects an image from the lower right to the projection surface SC by a user.

When a user sends a command to adjust the amount of distortion correction using the input device 80, the command is sent to the image processing controller 20 via the microprocessor 70. The distortion correction amount adjuster 240 (FIG. 2) included in the image processing controller 20 starts adjusting the amount of distortion correction based on the command.

Figure 3:
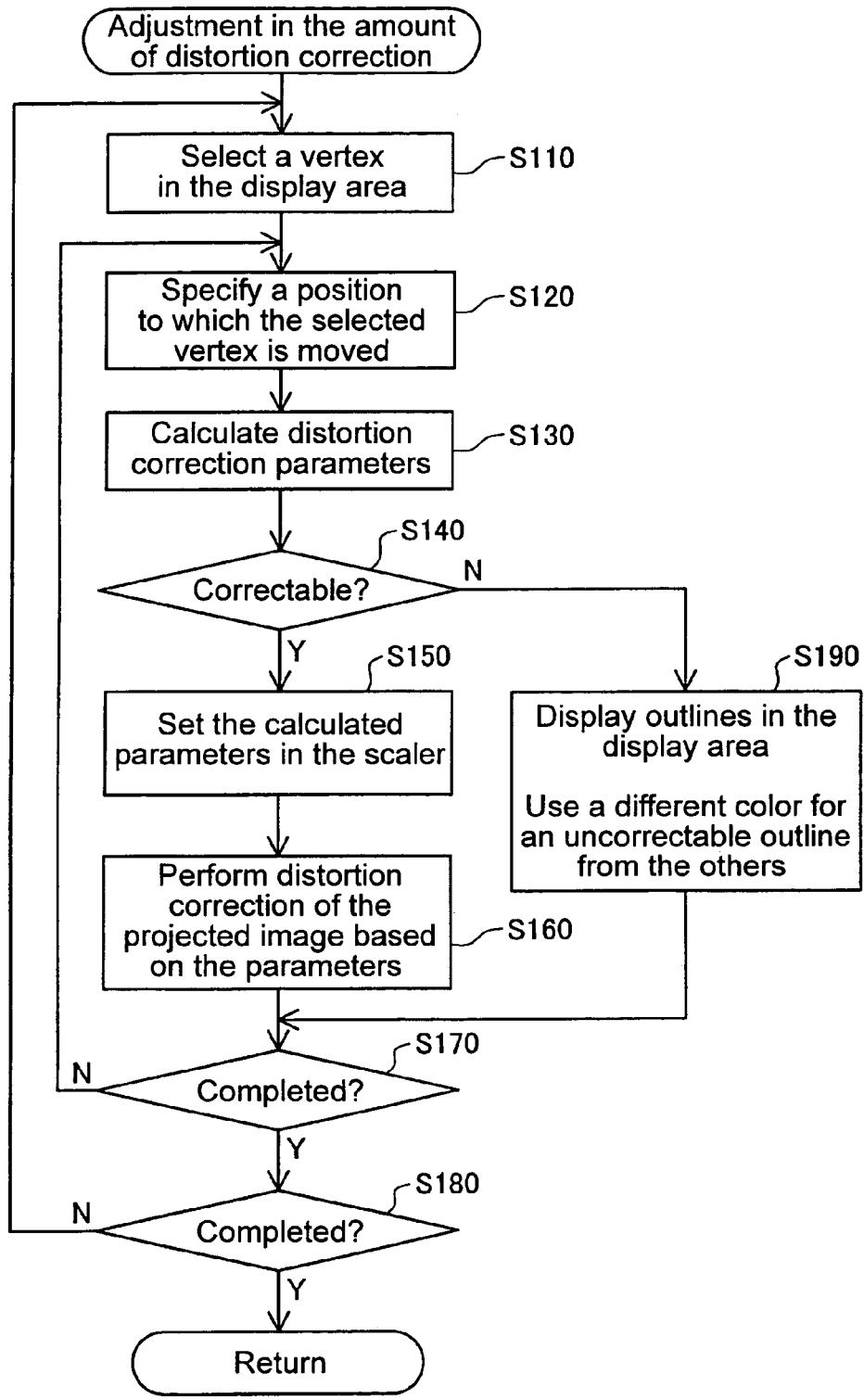
FIG. 3 is a flowchart showing an exemplary process of adjusting the amount of distortion correction given as a first example.

FIG. 3 is a flowchart showing an exemplary process of adjusting the amount of distortion correction given as a first example. On starting adjusting the amount of distortion correction, a user using a vertex selection key of the input device 80 selects a vertex whose displayed position is to be adjusted out of the four vertexes in a display area (step S110), and specifies a position to which the selected vertex is to be moved (step S120). The position to which the selected vertex is moved is specified by moving the position (coordinate) in the rectangular imaging area of the LCD 40, using a direction keys of the input device 80, by the predetermined number of pixels. For example, the position is specified by moving it horizontally and vertically by one pixel using an up/down/right/left key.

The data of the position (coordinate) to which the selected vertex is moved are input to the distortion correction amount adjuster 240 via the microprocessor 70. The distortion correction amount adjuster 240 calculates distortion correction parameters to be set in the register 222 included in the scaler 220 based on the data of the position to which the selected vertex is moved and positional data of the other non-selected vertexes (step S 130). Examples of the distortion correction parameters include the slope of each of the four sides joining the four vertexes, and the compression rate of the distortion correction image to the image (original image) of the image data input from the frame memory 210.

The distortion correction amount adjuster 240 judges whether the calculated distortion correction parameters are in the definable range of the register 222 included in the scaler 220, that is, whether the distortion correction can be applied (step S140). If it is judged that the distortion correction can be applied (step S140: Y), the calculated distortion correction parameters are set in the register 222 included in the scaler 220 (step S150). The scaler 220 then adjusts the amount of distortion correction based on the set distortion correction parameters, produces corrected image data by converting the input original image data to distortion correction image data, and performs the distortion correction of the projected image (step S160).

The above-mentioned process from step S120 of specifying the position to which the selected vertex is moved to step S160 of performing the distortion correction of the projected image is repeated until it is judged that the adjustment of the selected vertex is completed as the user sends a command to finish adjusting the selected vertex using a selected vertex adjustment complete key (step S170: Y). Also, the above-mentioned process from step S110 of selecting a vertex to step S160 of performing the distortion correction of the projected image is repeated until the user sends a command to finish adjusting the amount of distortion correction using a distortion correction amount adjustment complete key of the input device 80 (step S180: Y).

The above-mentioned process of adjusting the amount of distortion correction normally makes it possible to adjust the amount of distortion correction of projected images by adjusting outline forms of the distortion correction image formed in the imaging area of the LCD 40, like the example of conventional methods described referring to FIG. 12.

Now, if it is judged that the distortion correction cannot be applied in the above-mentioned process of adjusting the amount of distortion correction (step S140: N), the process is not followed by step S150 of setting the calculated distortion correction parameters in the register 222 included in the scaler 220. Instead of that, outlines of the image are shown in the display area on which the image is actually projected (step S190), as will be described in detail below.

Figure 4A:
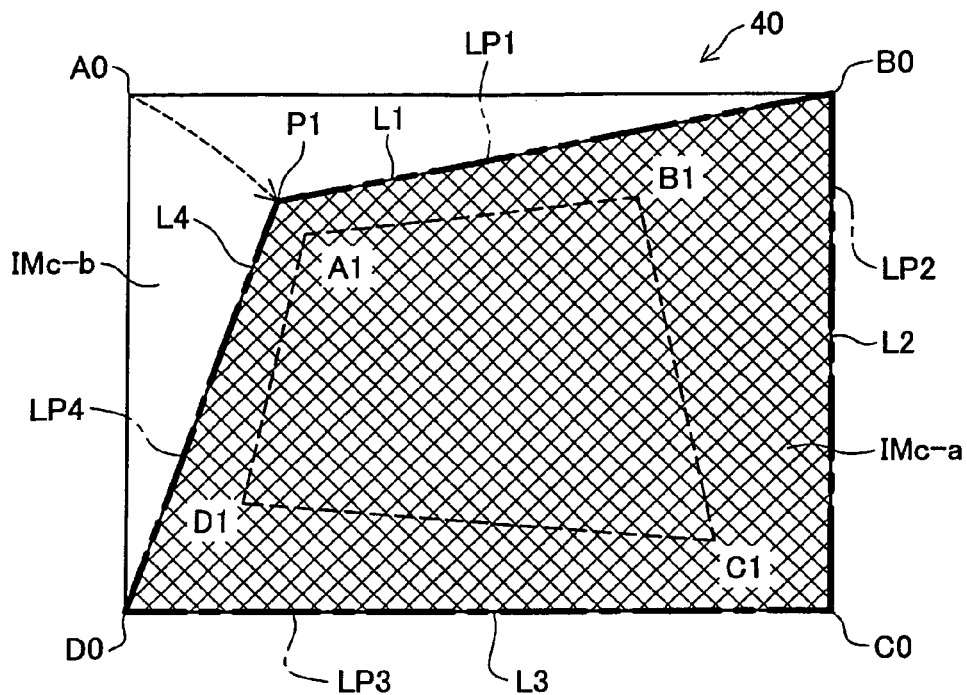
FIG. 4 shows the display of outlines in step S190 shown in FIG. 3.
Figure 4B:
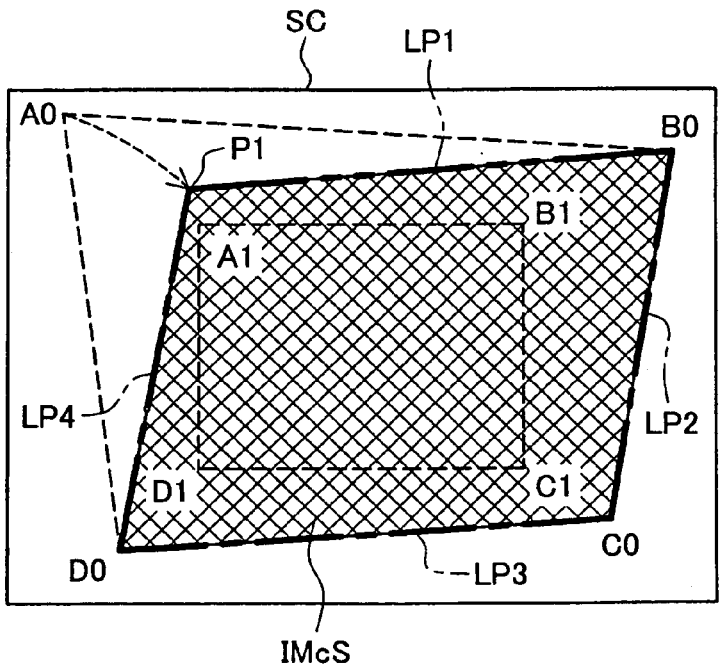

FIG. 4 shows the display of the outlines in step S190 shown in FIG. 3. As FIG. 4A shows, the OSD 250 produces outline data representing four outlines LP1, LP2, LP3, and LP4 that are equivalent to four sides L1, L2, L3, and L4 joining four vertexes P1, B0, C0, and D0 of the distortion correction image IMc-a (cross-hatched area) formed in the imaging area of the LCD 40. The outline data can be easily produced based on positional data of the four vertexes P1, B0, C0, and D0. The produced outline data are combined with the corrected image data by the mixer 230 and output to the LCD driver 30. Consequently as shown in FIG. 4A, the four outlines LP1, LP2, LP3, and LP4 are formed in the imaging area of the LCD 40. Then, these outlines are combined and displayed on the display area of the projected image IMcS (cross-hatched area) as shown in FIG. 4B. A dashed-line quadrangle A1B1C1D1 in FIG. 4A shows the shape of the distortion correction image that is needed to be formed in order to correct the distortion of the projected image.

If any of the four outlines are equivalent to the sides whose distortion correction parameter is judged that the distortion correction cannot be applied, these outlines are displayed in a different color from the other outlines. Referring to FIG. 4, the horizontal slope of the first side L1 is beyond the definable range when the vertex is moved down or right to the position P1. As a result the outline LP1 equivalent to the first side L1 is displayed in red (shown here by the double-dot dashed line), while the other outlines LP2, LP3, and LP4 are displayed in blue (shown here by the single-dot dashed lines).

If it is judged that the calculated distortion correction parameters are all definable (step S140: Y), the OSD 250 stops producing the outline data, and thereby stopping the display of the outlines. Referring to FIG. 4, for example, if the upper right vertex is moved from the position B0 to the position B1, the slope of the first side L1 decreases. Accordingly, at the point where it is judged that the calculated distortion correction parameters are all in the definable range, the distortion correction is performed (step S160 in FIG. 3). At the same time, the OSD 250 stops producing the outline data, and thereby stopping the display of the outlines. This makes it possible to reselect and move the upper left vertex located in the position P1 in the display area.

Figure 5A:
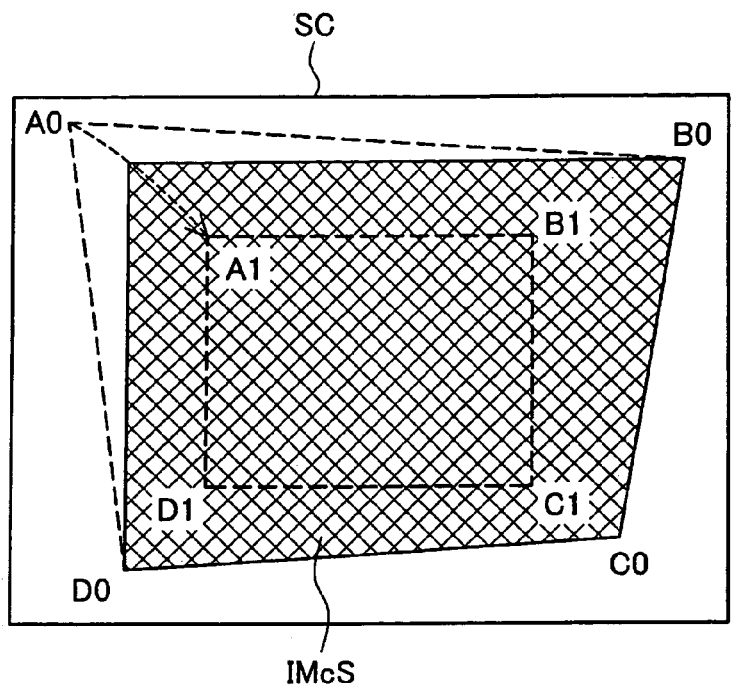
FIG. 5 shows the process of adjusting the amount of distortion correction referring to the first example.
Figure 5B:
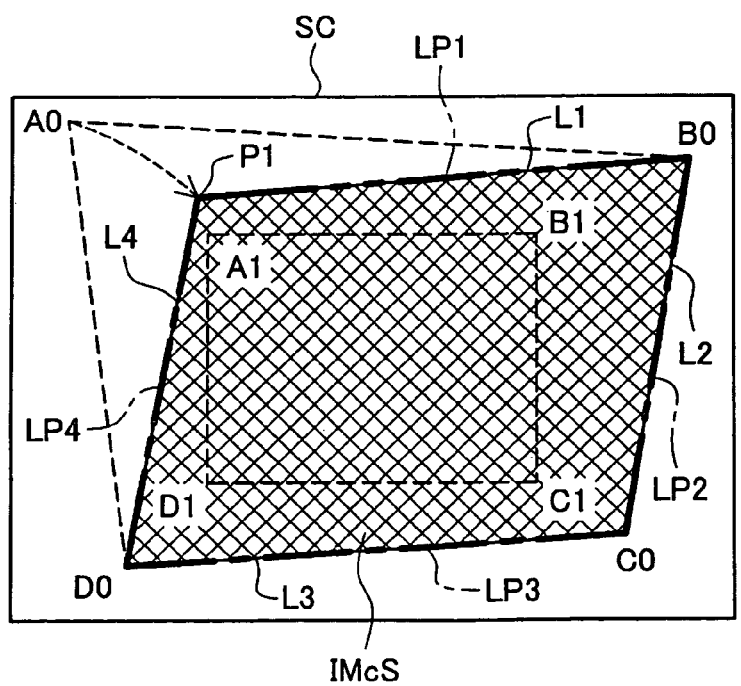
Figure 6A:
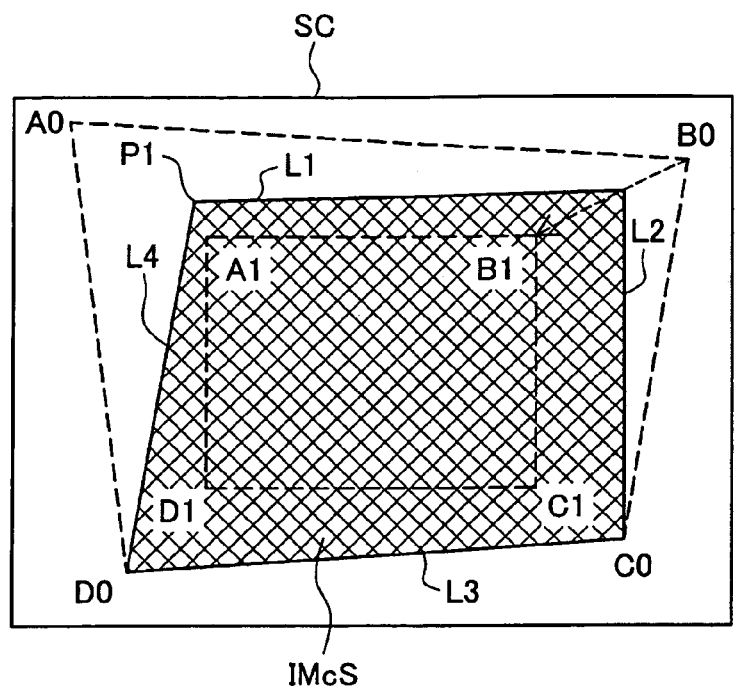
FIG. 6 shows the process of adjusting the amount of distortion correction referring to the first example.
Figure 6B:
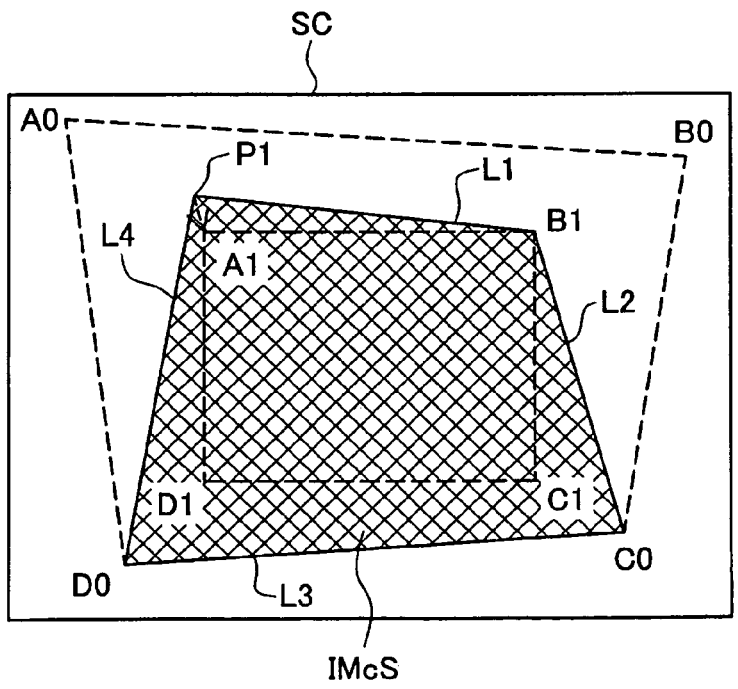

FIGS. 5 and 6 show an exemplary process of adjusting the amount of distortion correction referring to this example. In these drawings, the dashed quadrangle A0B0C0D0 shows an outline form of the display area projected on the projection surface SC under the initial condition with no distortion correction, while the quadrangle A1B1C1D1 shows an outline form (desired outline form) of the display area to be projected after performing the distortion correction.

By adjusting the amount of distortion correction referring to this example, it is possible to change the outline form of the display area as shown in FIGS. 5 and 6 while watching the display area. As FIG. 5A shows, first the upper left vertex of the projected image IMcS (cross-hatched area) displayed on the projection surface SC is selected and moved from the position A0 to the desired position A1. In the case where distortion correction is not allowed as a result of specifying a position down or right to the position P1, which is an intermediate position, as shown in FIG. 5B, the outlines LP1, LP2, LP3, and LP4 are displayed along the outline form of the projected image IMcS, which is a quadrangle P1B0C0D0 at the point P1.

Here for example, the horizontal slope of the first side L1 goes beyond the definable range when the upper left vertex is moved down or right to the position P1. As a result, the outline LP1 equivalent to the first side L1 is displayed in red (shown here by the double-dot dashed line), while the other outlines LP2, LP3, and LP4 are displayed in blue (shown here by the single-dot dashed lines). In this case, the upper right vertex is selected and moved from the position B0 to the desired position B1 as shown in FIG. 6A. This makes it possible to decrease the slope of the first side L1, which has prevented the upper left vertex from being moved any further. Therefore, it becomes possible to reselect the upper left vertex and move it from the position P1 to the desired position A1.

The other vertexes are also adjusted in the same manner, and thus the amount of distortion correction is adjusted in order to transform the projected image A0B0C0D0, which is not rectangular, into the projected image A1B1C1D1 that is rectangular.

In the above-mentioned adjustment in the amount of distortion correction referring to this example, by displaying the outlines a user easily sees that a further movement is not allowed while moving a selected vertex. Also, by displaying an outline equivalent to a side whose distortion correction parameter is judged that the distortion correction cannot be applied in a different color from the other outlines, the user easily sees the direction to which the selected vertex cannot be moved, i.e. the direction to which the outline form of the projected image cannot be changed. This improves operational performance in adjusting the amount of distortion correction.

According to this example, the scaler 220 corresponds to the image distortion correction part according to the invention. Also, the input device 80 and the microprocessor 70 correspond to the desired position specification part according to the invention, while the OSD 250 corresponds to the outline production part according to the invention.

Figure 7:
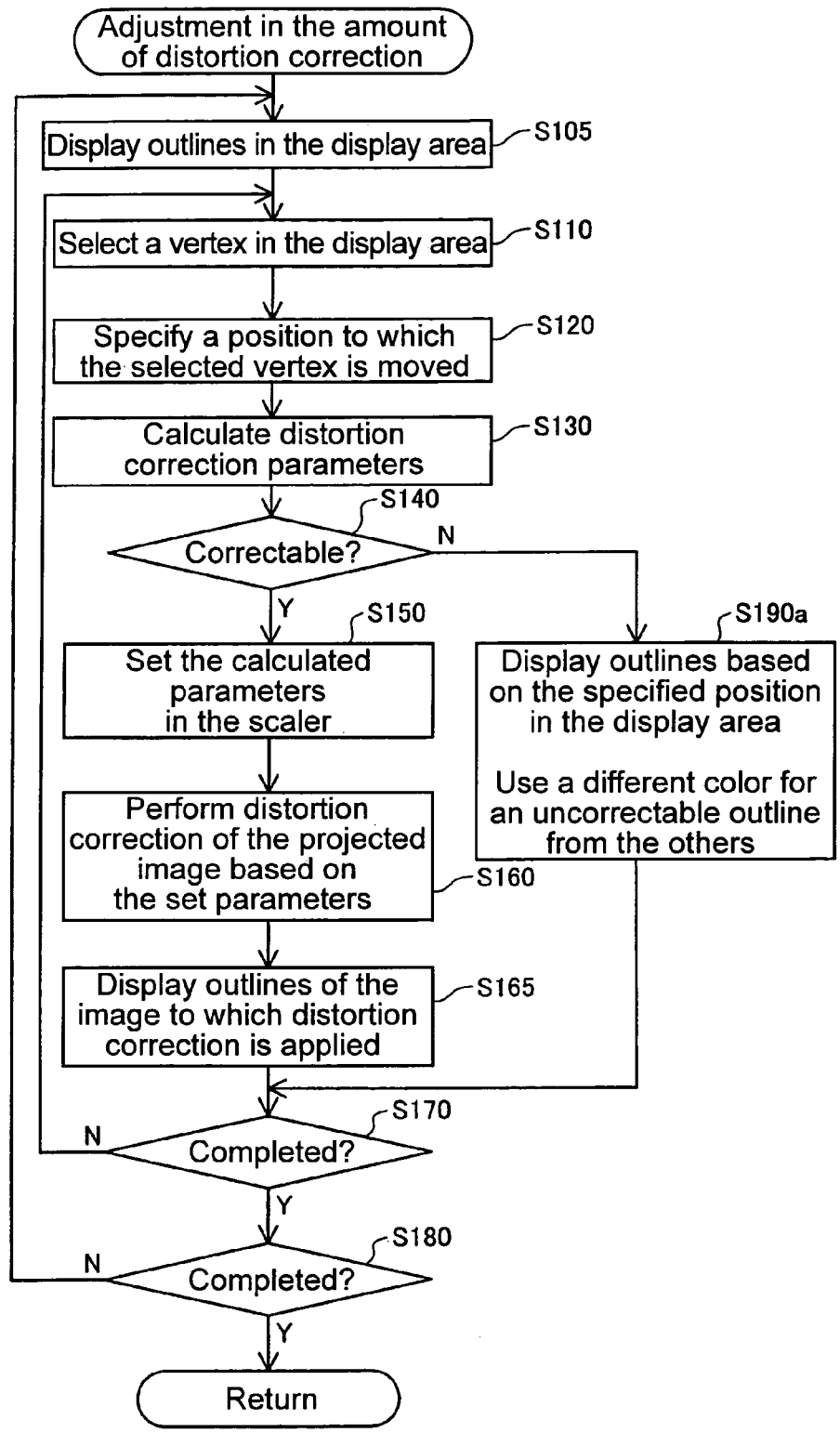
FIG. 7 is a flowchart showing the process of adjusting the amount of distortion correction given as a second example.

FIG. 7 is a flowchart showing an exemplary process of adjusting the amount of distortion correction given as a second example. Some steps in this example are the same as those in the first example shown in FIG. 3, and they are indicated by the same reference numerals.

The adjustment in the amount of distortion correction referring to this example starts with displaying display area outlines in a display area on which an image is projected (step S105). A method for displaying the outlines is the same as the one described in the first example referring to FIG. 4, and any further description is omitted here.

Like in the first example, the process from step S110 of selecting a vertex to step S160 of performing the distortion correction of the projected image is carried out. After performing the distortion correction of the projected image (step S160), outlines of the display area of the projected image, to which the distortion correction is applied, are displayed (step S165). A method for displaying the outlines is the same as the one in the above-mentioned step S105.

The adjustment in the amount of distortion correction referring to this example, as well as the one referring to the first example (steps S160 to S180 shown in FIG. 3), makes it possible to adjust the amount of distortion correction of the projected image.

Now, if it is judged that the distortion correction cannot be applied in the above-mentioned process of adjusting the amount of distortion correction (step S140: N), the process is not followed by step S150 of setting the calculated distortion correction parameters in the register 222 included in the scaler 220. Instead of that, outlines based on the specified position to which the selected upper left vertex is to be moved are displayed (step S190a). In this case, the outlines are not along the actual outlines of the display area of the projected image, but along the outline form (desired outline form) of the display area that can be set based on specified positional data of the selected vertex. A method for displaying the outlines of the desired outline form here is also the same as the one in the above-mentioned step S105, except for the use of the specified positional data of the selected vertex instead of the actual positional data of the vertex.

FIGS. 8 and 9 show the process of adjusting the amount of distortion correction referring to this example. In these drawings, the dashed quadrangle A0B0C0D0 shows an outline form of the display area outlines on the projection surface SC under an initial condition with no distortion correction, while the quadrangle A1B1C1D1 shows the outline form (desired outline form) of the display area to be projected after performing the distortion correction. The single-dot and double-dot dashed lines show display area outlines of the projected image IMcS (cross-hatched area).

Figure 8A:
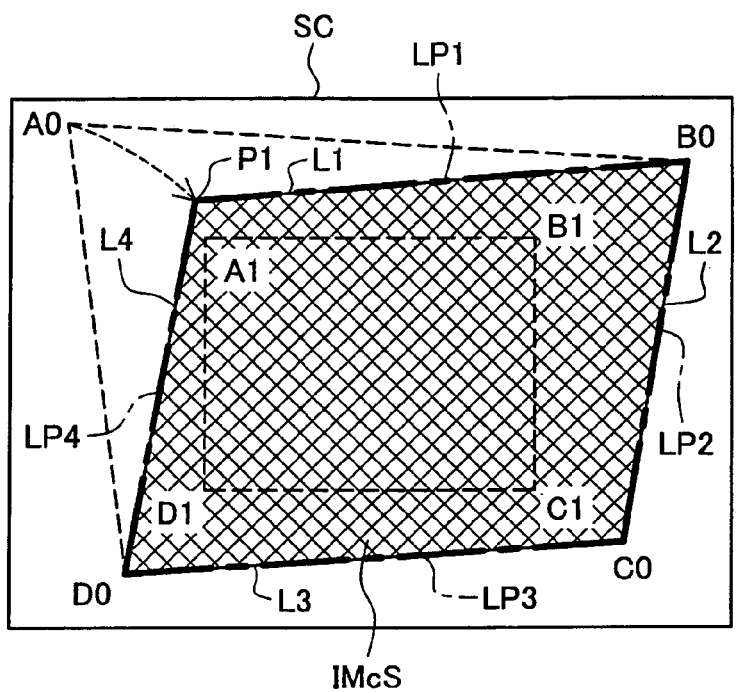
FIG. 8 shows the process of adjusting the amount of distortion correction referring to the second example.

By adjusting the amount of distortion correction referring to this example, it is possible to change the form of the display area as shown in FIGS. 8 and 9 while watching the display area. As FIG. 8A shows, first the upper left vertex of the projected image IMcS (cross-hatched area) displayed on the projection surface SC is selected and moved from the position A0 to the desired position A1. FIG. 8A shows that the upper left vertex is at the position P1, which is an intermediate position. Here it is assumed that, because the horizontal slope of the first side L1 in the display area is beyond the definable range when the upper left vertex in the display area is moved down or right to the position P1, any further movement of the upper left vertex is not allowed.

Figure 8B:
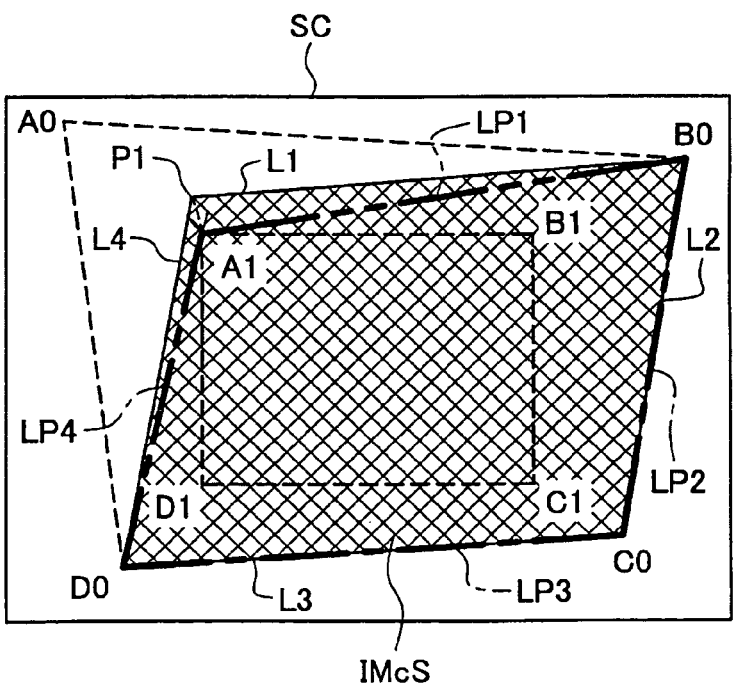

If the selected vertex is specified to be located close to the position A1 beyond the position P1 as shown in FIG. 8B, a calculated distortion correction parameter goes beyond the definable range. As a result, distortion correction is not applied any further, so that the outline form of the display area of the projected image IMcS undergoes no change. Meanwhile, the four outlines LP1, LP2, LP3, and LP4 are displayed in positions different from the display area outlines of the projected image IMcS, that is, the positions of the outline form (desired outline form) of the display area that can be set based on the specified positions of the upper left vertex and the other vertexes. FIG. 8B shows the case where the position of the upper left vertex is specified at the desired position A1.

If any of the four outlines correspond to a distortion correction parameter which is judged to be beyond the definable range, these outlines are displayed in a different color from the other outlines like in the first example. Referring to FIG. 8B, the outline LP1 is displayed in red (shown here by the double-dot dashed line), while the other outlines LP2, LP3, and LP4 are displayed in blue (shown here by the single-dot dashed lines).

Figure 9A:
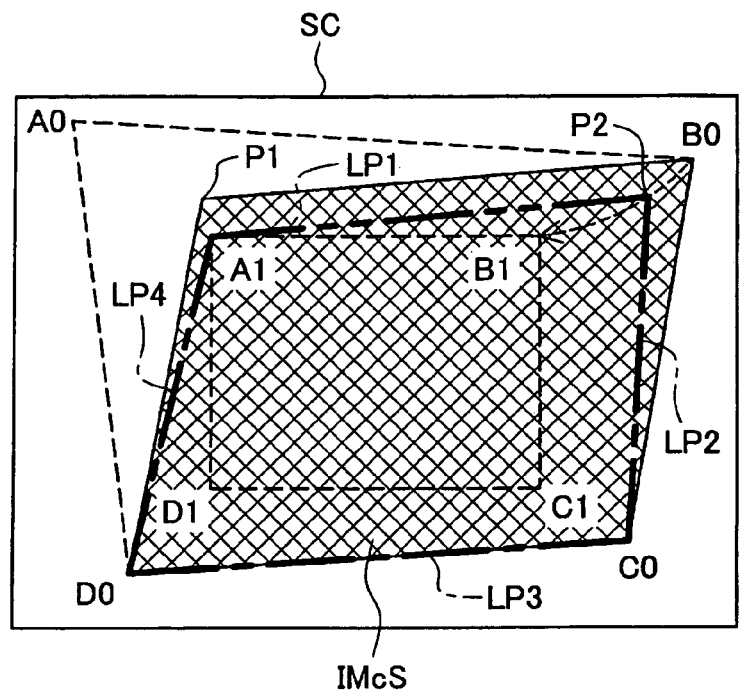
FIG. 9 shows the process of adjusting the amount of distortion correction referring to the second example.
Figure 9B:
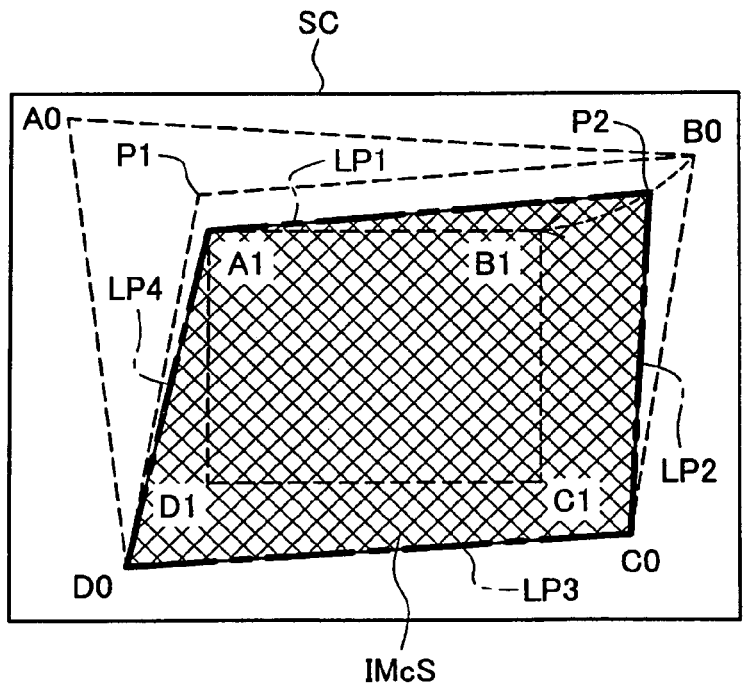

As shown in FIG. 9A, if the upper right vertex located in the position B0 in the display area is selected and its specified position is moved to the desired position B1, the slope of the outline LP1 decreases. Accordingly, at the point where the calculated distortion correction parameters come within the definable range, the distortion correction is performed so as to make the form of the display area of the projected image IMcS (cross-hatched area) equivalent to the desired outline form indicated by the outlines LP1, LP2, LP3, and LP4 as shown in FIG. 9B. The other vertexes are also adjusted in the same manner, and thus the amount of distortion correction is adjusted in order to transform the projected image A0B0C0D0, which is not rectangular, into the projected image A1B1C1D1 that is rectangular.

In the above-mentioned adjustment in the amount of distortion correction referring to this example, by displaying the outlines like in the first example, a user easily sees that the distortion correction is prohibited while moving a selected vertex, and thereby any further movement is not allowed. Also, by displaying an outline equivalent to a side whose distortion correction parameter is judged that the distortion correction cannot be applied in a different color from the other outlines, the user easily sees the direction to which the selected vertex cannot be moved, i.e. the direction to which the outline form of the projected image cannot be changed. This improves operational performance in adjusting the amount of distortion correction.

Furthermore, the adjustment in the amount of distortion correction referring to this example makes it possible to display the outline form (desired outline form) of the display area based on a desired position of a selected vertex by specifying the desired position to which the vertex is to be moved, even in the case where any further movement of the selected vertex is not allowed. Therefore, by specifying a desired position of a vertex whose further movement is not allowed and moving the other vertexes, distortion correction is provided for achieving a desired outline form at the point where the movement of the vertex becomes allowed in this example. According to the first example compared to this, in order to further move a vertex whose further movement is not allowed, it is necessary to make the movement of the vertex allowed by selecting and moving the other vertexes. Thus, this example further improves operational performance in adjusting the amount of distortion correction compared to the first example.

Also according to this example, the scaler 220 corresponds to the image distortion correction part according to the invention. Also, the input device 80 and the microprocessor 70 correspond to the desired position specification part according to the invention, while the OSD 250 corresponds to the outline production part according to the invention.

It should be understood that the invention is not limited to the above-mentioned examples and embodiment, but that it can be applied to various modes including the ones that will be described below, without departing from the spirit and scope of the invention.

Figure 10:
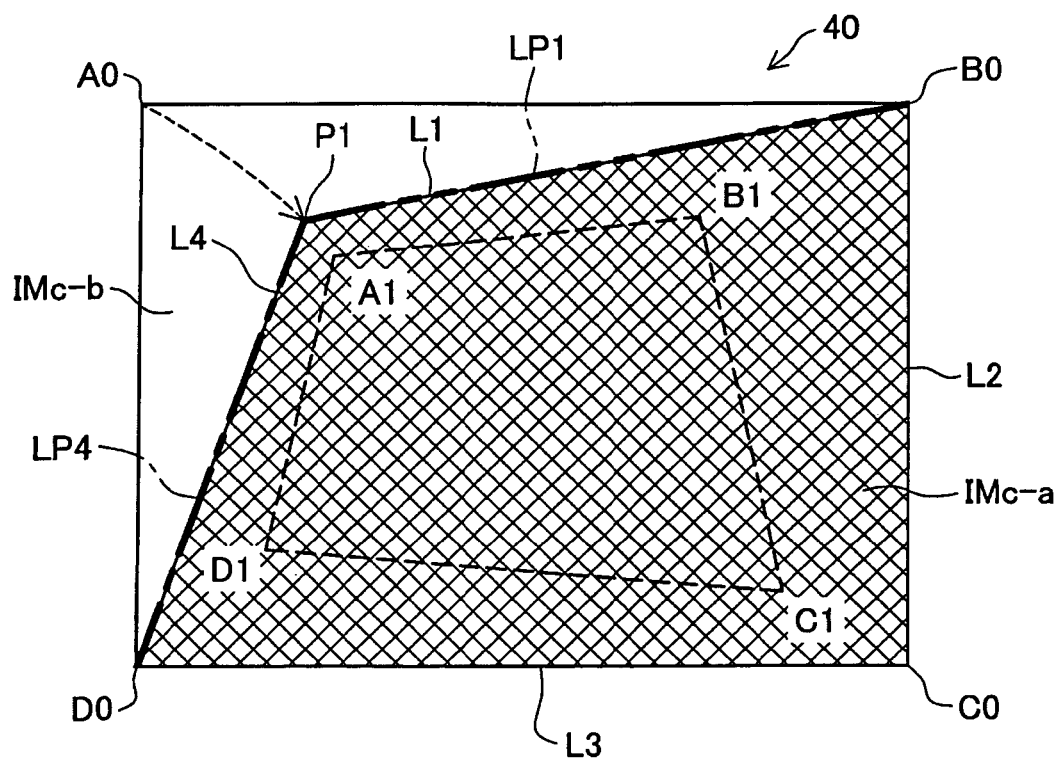
FIG. 10 shows the display of outlines given as a first modification.
Figure 12A:
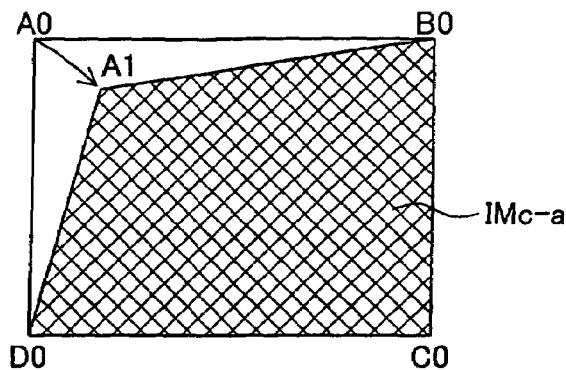
FIG. 12 shows an example of the process of adjusting the shape of a distortion correction image IMc-a.
Figure 12B:
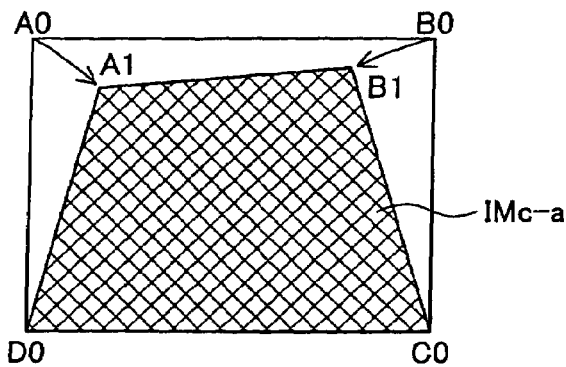
Figure 12C:
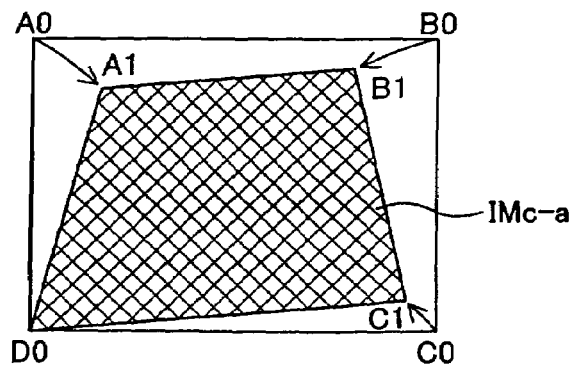
Figure 12D:
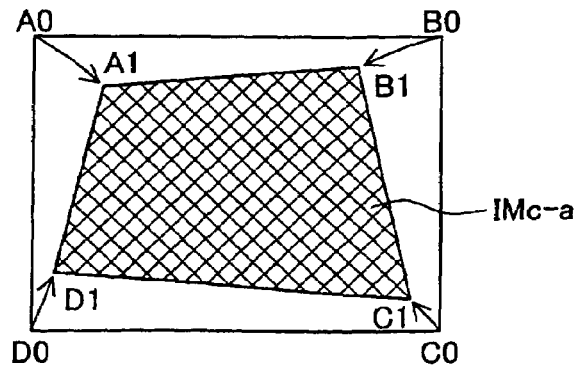
Figure 13:
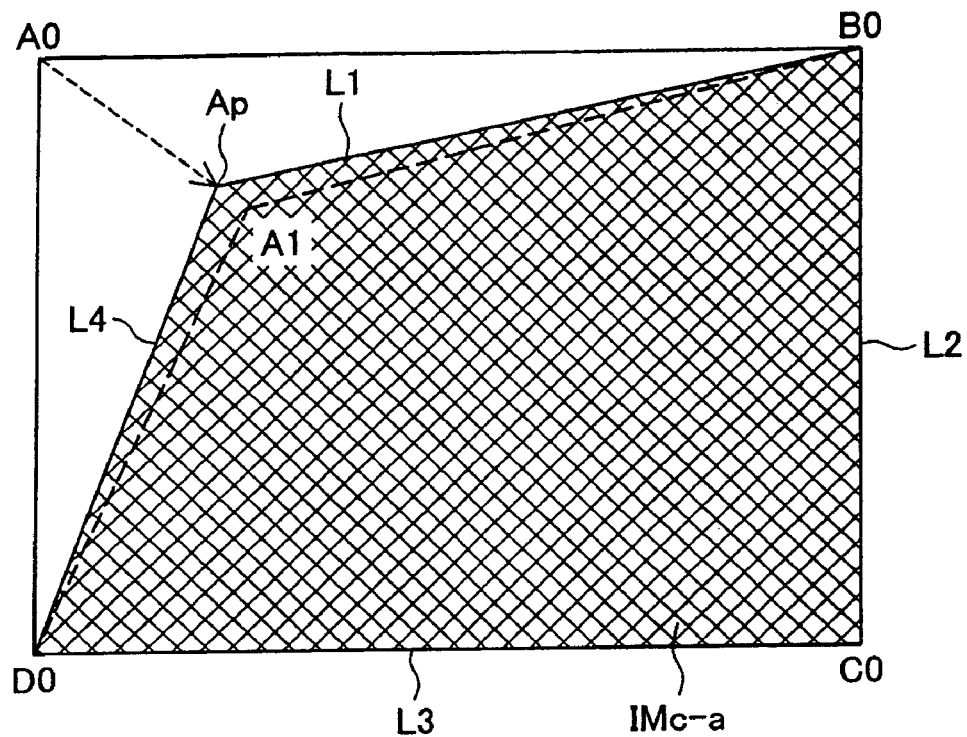
FIG. 13 illustrates a problem caused by conventional methods.

While the four outlines are displayed both in the first and second examples, only two outlines equivalent to two lines coupled to a selected vertex may be displayed. FIG. 10 shows the display of outlines given as this modification. As FIG. 10 shows, when the upper left vertex is selected and moved from the position A0 to the position P1, the outline LP1 equivalent to the first side L1, that goes beyond the definable range, is displayed in red (shown here by the double-dot dashed line), while the other outline LP4 is displayed in blue (shown here by the single-dot dashed lines).

While the case where the outlines are displayed if any movement of a selected vertex is not allowed is given in the first example, the outlines may be always displayed while adjusting the amount of distortion correction like in the second example.

While the case where the outlines are always displayed while adjusting the amount of distortion correction is given in the second example, the outlines may be displayed only when any movement of a selected vertex is not allowed.

While the outlines are displayed in different colors both in the first and second examples, different widths or types of outlines may be used instead. And only the outline corresponding to the amount of distortion correction beyond the predetermined range may be displayed.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A projector that projects an image on a projection surface, comprising:

an image distortion correction part that produces a distortion correction image by transforming an original image based on a set amount of distortion correction so as to correct distortion of the projected image that occurs if the image is projected obliquely on the projection surface;

a desired position specification part that specifies desired positions at which four vertexes forming an outline form of the projected image are to be located so as to adjust the outline form of the projected image to a desired outline form;

a distortion correction amount adjuster that adjusts an amount of distortion correction, set in the image distortion correction part, based on the desired positions specified by the desired position specification part; and an outline production part that produces an outline corresponding to the outline form of the projected image;

in adjusting the amount of distortion correction set in the image distortion correction part, the distortion correction amount adjuster:

if the desired position specification part specifies the desired positions, calculates values of the amount of distortion correction for the desired outline form to be formed based on the desired positions;

judges whether all the calculated values of the amount of distortion correction are within a predetermined range where the original image is transformable into the distortion correction image;

if all the calculated values of the amount of distortion correction are within the predetermined range, sets the calculated values of the amount of distortion correction in the image distortion correction part; and if a value out of the calculated values of the amount of distortion correction is beyond the predetermined range, makes the outline production part produce outlines corresponding to at least part of the outline form of the projected image and makes an outline form corresponding to the amount of distortion correction beyond the predetermined range different from an outline form corresponding to the amount of distortion correction within the predetermined range so that each is identified, instead of setting the calculated values of the amount of distortion correction in the image distortion correction part.

2. The projector according to claim 1, each of the outline form corresponding to the amount of distortion correction beyond the predetermined range and the outline form corresponding to the amount of distortion correction within the predetermined range identified by any one of presence or absence of line, different line colors, different line widths, and different line types.

3. The projector according to claim 1, the distortion correction amount adjuster judging whether all the calculated values of the amount of distortion correction are within a predetermined range based on the amount of a horizontal or vertical slope of each of the four sides forming the desired outline form.

4. The projector according to claim 1, the distortion correction amount adjuster making the outline production part produce the outlines corresponding to the outline form of the projected image even if all the calculated values of the amount of distortion correction are within the predetermined range.

5. A projector that projects an image on a projection surface, comprising:

an image distortion correction part that produces a distortion correction image by transforming an original image based on a set amount of distortion correction so as to correct distortion of the projected image that occurs if the image is projected obliquely on the projection surface;

a desired position specification part that specifies desired positions at which four vertexes forming an outline form of the projected image are to be located so as to adjust the outline form of the projected image to a desired outline form;

a distortion correction amount adjuster that adjust an amount of distortion correction, set in the image distortion correction part, based on the desired positions specified by the desired position specification part; and an outline production part that produces an outline corresponding to the desired outline form of the projected image to be formed by specifying the desired positions;

in adjusting the amount of distortion correction set in the image distortion correction part, the distortion correction amount adjuster:

if the desired position specification part specifies the desired positions, calculates values of the amount of distortion correction for the desired outline form to be formed based on the desired positions;

judges whether all the calculated values of the amount of distortion correction are within a predetermined range where the original image is transformable into the distortion correction image;

if all the calculated values of the amount of distortion correction are within the predetermined range, sets the calculated values of the amount of distortion correction in the image distortion correction part; and if a value out of the calculated values of the amount of distortion correction is beyond the predetermined range, makes the outline production part produce outlines corresponding to at least part of the desired outline form and makes an outline form corresponding to the amount of distortion correction beyond the predetermined range different from an outline form corresponding to the amount of distortion correction within the predetermined range so that each is identified, instead of setting the calculated values of the amount of distortion correction in the image distortion correction part.

6. The projector according to claim 5, each of the outline form corresponding to the amount of distortion correction beyond the predetermined range and the outline form corresponding to the amount of distortion correction within the predetermined range being identified by any one of presence or absence of line, different line colors, different line widths, and different line types.

7. The projector according to claim 5, the distortion correction amount adjuster judging whether all the calculated values of the amount of distortion correction are within a predetermined range based on the amount of a horizontal or vertical slope of each of the four sides forming the desired outline form.

8. The projector according to claim 5, the distortion correction amount adjuster making the outline production part produce the outlines corresponding to the outline form of the projected image even if all the calculated values of the amount of distortion correction are within the predetermined range.

* * * * *